W. DURYEA.
Removing Starch Deposits.
No. 42,358. Patented Apr. 19, 1864.
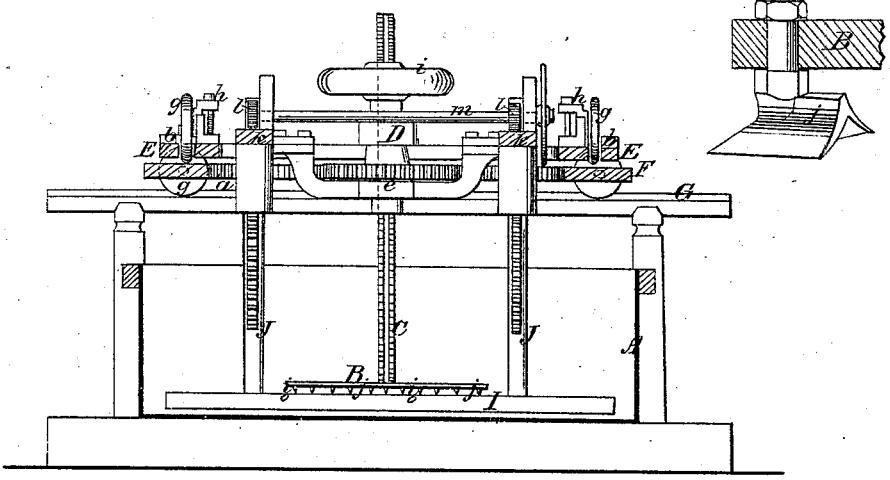
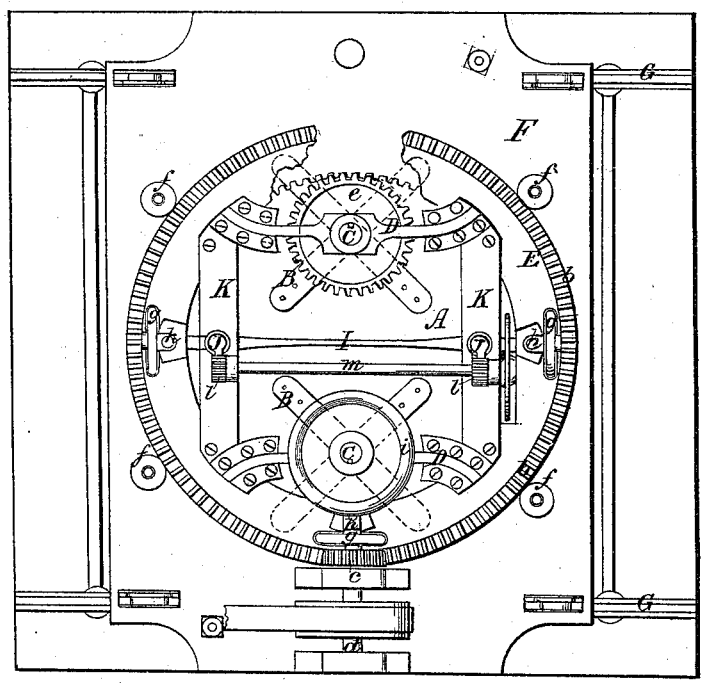
Witnesses:
Jas R Hall
Geo V Reed
Inventor:
Wright Duryea

UNITED STATES PATENT OFFICE.

WRIGHT DURYEA, OF GLEN COVE, NEW YORK.

IMPROVED MACHINE FOR REMOVING STARCH DEPOSITS.

Specification forming part of Letters Patent No. 42,358, dated April 19, 1864.

*To all whom it may concern:*

Be it known that I, WRIGHT DURYEA, of Glen Cove, in the county of Queens and State of New York, have invented a new and useful Improvement in Apparatus for Removing Starch Deposits; and I do hereby declare that the following is a full, clear, and exact description of the same, reference being had to the accompanying drawings, forming a part of this specification, in which—

Figure 1 represents a vertical central section of my invention. Fig. 2 is a plan or top view of the same. Fig. 3 is a perspective sectional view of one of the plows in a larger scale than the previous figures.

Similar letters of reference in the three views indicate corresponding parts.

This invention consists in the employment or use, in a starch-cistern, of agitators secured to vertical shafts descending into said cistern at points outside its center, and operated by means of a sun-and-planet gear in such a manner that the effect of the agitators is equally powerful in the center of the cistern and at or near its skirts or circumference, and the accumulation of a deposit in the center of the cistern is obviated. The invention consists, further, in the application of a scraper extending clear across the center of the cistern, and suspended from rods to which a rising-and-falling motion can be imparted by toothed racks and pinions, in combination with a revolving ring or annular turn-table in such a manner that said scraper can be adjusted up and down to any desired height from the bottom of the cistern, and by its action, combined with that of the sun and-planet agitators, the accumulation of a deposit on any part of the cistern is effectually prevented. The invention consists, finally, in the arrangement of a platform supported by and moving on rails over a series of cisterns, in combination with agitators and scrapers, (either alone or both combined,) which are vertically adjustable by screw-rods, toothed racks, and pinions, or other equivalent devices, in such a manner that the agitating mechanism can be raised above the top edge of the cistern and removed by means of the rails supporting the platform from one cistern to the other, and by these means one and the same agitating mechanism will serve for a series of cisterns.

To enable others skilled in the art to make and use my invention, I will proceed to describe it.

A represents one of a series of cisterns, made of sheet metal, staves, or any other suitable material, round, oval, polygonal, or square, and of that class which are generally used in the manufacture of starch. In large manufactories a series of such cisterns are arranged in one or more rows, each being provided with a stirrer attached to a central shaft, to which motion is imparted by suitable line-shafts and belts. This arrangement necessitates a very large amount of machinery and of shafting, and consequently a large outlay in capital. Furthermore, the application of a stirrer to a central shaft is objectionable, because a stirrer thus applied takes effect at or near the skirts of the cistern, but suffers the starch-deposit to accumulate in the center, to the great detriment of the successful progress of the operation. In order to obviate these difficulties and disadvantages, I have applied two or more agitators, B, to vertical spindles C, which descend into the cistern at points outside its center, as clearly shown in the drawings. These spindles have their bearings in bridges D, secured to an annular table or ring, E, and this ring is provided with teeth $b$, which gear into a pinion, $c$, on the end of the driving-shaft $d$, so that by the action of said shaft a rotary motion is imparted to the ring E.

The ring E is supported by a platform, F, which is provided with an internal gearing, $a$, meshing into cog-wheels $e$, which are secured to the spindles C, and by the combination of the ring E, platform F, and gears $a$ $e$ a sun-and-planet motion is imparted to the agitators B, causing them to sweep with the same effect over all parts of the cistern, and to remove the deposit from its center as well as from its skirts. The platform F rests upon a track, G, at some distance above the upper edge of the cistern A, and the ring E is confined between four (more or less) friction-rollers, $f$, as shown clearly in Fig. 2. Said ring travels upon four (more or less) wheels, $g$, which are adjustable up and down by means of set-screws $h$, so that the ring E can be raised or lowered, as may be desirable.

The spindles C, which carry the agitators B, are provided with a screw-thread, and they pass freely through the cog-wheels $e$, said cog-wheels being compelled to rotate with the spindle by means of keys or feathers secured in their hubs and fitting into grooves cut into the spindles and extending from the top to the bottom of the same. Hand-wheels $i$, tapped so as to fit the screw-spindles C, serve to raise and lower the same, together with the agitators B. The agitators are composed of four (more or less) arms, which extend from the lower ends of the spindles C, and they may be provided with plows $j$, secured to said arms in the manner shown in Fig. 3, leaving each plow an independent rotary motion, and allowing the same to adjust themselves according to the position of the agitators. By this arrangement the plows are made to work point foremost, and their effect in removing starch-deposit is considerably improved.

I is a scraper, which is attached to one or more vertical bars, J, which fit into suitable sockets in bridge-pieces $k$, secured to the ring E on opposite sides from its center. Each of the vertical bars J is provided with a toothed rack meshing into a pinion, $l$, which is secured to a shaft, $m$, so that by imparting to this shaft a rotary motion the scraper I can be raised from or lowered to the bottom of the cistern. This scraper extends across the center of the cistern, and it travels round with the ring E. It may, if desired, be supplied with plows similar to the plows $j$ of the agitators, and secured permanently therein, as they revolve always in the same direction. By its action, combined with that of the agitators B, the accumulation of a deposit on any one place of the cistern is effectually prevented.

The track G, which supports the platform F, extends over the whole series of cisterns, so that by raising the agitators and the scraper high enough to clear the upper edges of the cisterns the entire agitating mechanism can be moved from one cistern to the other; and in order to simplify the machinery which is necessary to impart motion to the agitators, I propose to place an engine on the platform F, and to supply this engine with steam through a series of pipes from a stationary boiler, so that whenever the agitating mechanism has been adjusted over one of the cisterns the steam-pipe corresponding to this cistern can be connected to the engine, and motion can be imparted to said agitating mechanism without requiring a multiplicity of shafts, pulleys, and belts.

What I claim as new, and desire to secure by Letters Patent, is—

1. The agitators B, arranged, in combination with a cistern, A, on shafts C, descending into said cistern at points outside its center, and with a sun-and-planet gear, $e\ a\ b\ c$, constructed and operating in the manner and for the purpose herein shown and described.

2. The scraper I, in combination with the cistern A, revolving ring E, and one or more vertically-adjustable bars, J, constructed and operating in the manner and for the purpose substantially as set forth.

3. The platform F and rails G, in combination with cistern A and agitating mechanism, constructed and operating in the manner and for the purpose substantially as set forth.

WRIGHT DURYEA.

Witnesses:
M. M. LIVINGSTON,
GEO. W. REED.